US011018482B2

(12) United States Patent
Oka et al.

(10) Patent No.: US 11,018,482 B2
(45) Date of Patent: May 25, 2021

(54) COATING-PEELING APPARATUS OF RECTANGULAR CONDUCTOR WIRE

(71) Applicant: HONDA MOTOR CO., LTD., Tokyo (JP)

(72) Inventors: Keiichiro Oka, Tochigi-ken (JP); Yosuke Komatsu, Tochigi-ken (JP); Kenji Masai, Tochigi-ken (JP); Tomotsugu Takahashi, Tochigi-ken (JP); Junya Shigeno, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/140,752

(22) Filed: Sep. 25, 2018

(65) Prior Publication Data

US 2019/0103734 A1    Apr. 4, 2019

(30) Foreign Application Priority Data

Sep. 29, 2017   (JP) .............................. JP2017-192074

(51) Int. Cl.
*H02G 1/12*   (2006.01)
(52) U.S. Cl.
CPC ......... *H02G 1/1202* (2013.01); *H02G 1/1256* (2013.01); *H02G 1/1285* (2013.01)
(58) Field of Classification Search
CPC .. H02G 1/1202; H02G 1/1256; H02G 1/1285; H02G 1/1295; H02G 1/1268; H02K 15/0421; Y10T 29/514
See application file for complete search history.

(56) References Cited

U.S. PATENT DOCUMENTS 3,309,948 A * 3/1967 Falken .................. H01R 43/05
                                                    81/9.51
3,748,932 A * 7/1973 Neiman ............... H02G 1/1248
                                                    81/9.51
(Continued)

FOREIGN PATENT DOCUMENTS

CN    102290748    12/2011
CN    205668209    11/2016
(Continued)

OTHER PUBLICATIONS

Chinese Office Action and Search Report for Chinese Patent Application No. 201811139291.7 dated Sep. 17, 2019.

*Primary Examiner* — Jonathan G Riley
(74) *Attorney, Agent, or Firm* — Amin, Turocy & Watson, LLP

(57) ABSTRACT

The present invention relates to a method of coating-peeling and a coating-peeling apparatus. The method of coating-peeling includes a gripping step and a peeling step, and peels by a pair of peeling blades peeling target portions of an insulating coating covering peeling target side surfaces of a rectangular conductor wire. In the gripping step, abutting sections of a pair of gripping members abut on gripping target portions of the insulating coating, whereby the rectangular conductor wire is gripped between the abutting sections. In the peeling step, in a state where the rectangular conductor wire has been gripped by the gripping members, the peeling blades are moved relatively following a surface direction of the peeling target side surfaces while opposing each other sandwiching the peeling target side surfaces, whereby the peeling target portions are peeled.

7 Claims, 12 Drawing Sheets

(56) References Cited

U.S. PATENT DOCUMENTS

| | | | | |
|---|---|---|---|---|
| 3,846,894 A * | 11/1974 | Parsons | ............... | H02G 1/1295 |
| | | | | 76/104.1 |
| 4,025,998 A * | 5/1977 | Eppler | ................... | H02G 1/005 |
| | | | | 29/566.4 |
| 4,387,746 A * | 6/1983 | Meehan | ................. | H02G 1/005 |
| | | | | 140/105 |
| 4,870,878 A * | 10/1989 | Butler | ................... | H02G 1/1268 |
| | | | | 81/9.51 |
| 5,142,950 A * | 9/1992 | Takano | ............... | H02G 1/1268 |
| | | | | 29/825 |
| 5,664,324 A * | 9/1997 | Hoffa | ................... | H02G 1/1256 |
| | | | | 29/33 M |
| 6,487,939 B1 * | 12/2002 | Cowher | ............. | G02B 6/02123 |
| | | | | 81/9.4 |
| 9,318,235 B2 * | 4/2016 | Sato | .................... | H02G 1/1268 |
| 2015/0052736 A1 * | 2/2015 | Hayashi | ............ | H02K 15/0421 |
| | | | | 29/596 |
| 2018/0083430 A1 | 3/2018 | Sakamoto et al. | | |

FOREIGN PATENT DOCUMENTS

| | | |
|---|---|---|
| JP | 2000-125431 | 4/2000 |
| JP | 2011-182597 | 9/2011 |
| JP | 2018-050362 | 3/2018 |

\* cited by examiner

COATING-PEELING APPARATUS OF RECTANGULAR CONDUCTOR WIRE

CROSS-REFERENCE TO RELATED APPLICATION

This application is based upon and claims the benefit of priority from Japanese Patent Application No. 2017-192074 filed on Sep. 29, 2017, the contents of which are incorporated herein by reference.

BACKGROUND OF THE INVENTION

Field of the Invention

The present invention relates to a method of coating-peeling and a coating-peeling apparatus of a rectangular conductor wire by which an insulating coating covering a side surface of the rectangular conductor wire is peeled.

Description of the Related Art

Japanese Laid-Open Patent Publication No. 2000-125431, for example, discloses a coating-peeling apparatus that peels an insulating coating of a covered wire which is configured from a wire and from the insulating coating covering a side surface of said wire. In this coating-peeling apparatus, the insulating coating is peeled using a pair of peeling blades opposing each other at a distance depending on a length in a width direction orthogonal to an extending direction of the wire. Specifically, due to the gripping of the side surface of the covered wire with a gripping member that has been positioned relatively to the peeling blades, the covered wire has its position fixed such that a center in a width direction of the covered wire and a center of a distance between peeling blades coincides. By abutting the peeling blades on the covered wire and moving them relatively along the extending direction of the wire as described above, in this state, it becomes possible for the insulating coating disposed on both sides in the width direction of the wire to each be peeled.

The gripping member in the above-described coating-peeling apparatus includes: a fixed gripping member fixed to a fixing pedestal; and a movable gripping member provided so as to be movable in a direction of approaching or separating from said fixed gripping member. Moreover, due to the move of the movable gripping member so as to abut on the covered wire that has been placed on the fixed gripping member, the covered wire is gripped between the fixed gripping member and the movable gripping member, whereby the covered wire has its position fixed.

SUMMARY OF THE INVENTION

In the above-described coating-peeling apparatus, the fixed gripping member is fixed to the fixing pedestal, so a fixing position of the covered wire by the gripping member cannot be adjusted. In other words, it is difficult for a covered wire having an insulating coating of other than a predetermined thickness to have its position fixed such that a center in the width direction of a wire of the covered wire and the center of the distance between peeling blades coincide. As a result, there is concern that if there are variations in a wire width of the covered wire and a thickness of the insulating coating, then the insulating coating on both sides in the width direction of the wire cannot be favorably peeled, and there occur peeling defects such as the insulating coating on one side being left, for example. Hence, it has been difficult for the above-described coating-peeling apparatus to be applied to a covered wire having a variation in thickness of the insulating coating.

A main object of the present invention is to provide a method of coating-peeling of a rectangular conductor wire that enables an insulating coating to be peeled highly precisely even when a thickness of the insulating coating varies.

Another object of the present invention is to provide a coating-peeling apparatus of a rectangular conductor wire that enables an insulating coating to be peeled highly precisely even when a thickness of the insulating coating varies.

According to an embodiment of the present invention, there is provided a method of coating-peeling of a rectangular conductor wire by which, assuming opposing side surfaces of the rectangular conductor wire to be a pair of peeling target side surfaces, peeling target portions of an insulating coating covering the peeling target side surfaces are respectively peeled by a pair of peeling blades that oppose each other at a distance, including: a gripping step in which abutting sections of a pair of gripping members abut on gripping target portions of the insulating coating covering the peeling target side surfaces, whereby the rectangular conductor wire is gripped between the abutting sections opposing each other sandwiching the gripping target portions; and a peeling step in which, in a state where the rectangular conductor wire has been gripped by the gripping members, a pair of the peeling blades are moved relatively so as to be orthogonal to an extending direction of the rectangular conductor wire and follow a surface direction of the peeling target side surfaces while opposing each other sandwiching the peeling target side surfaces, whereby the peeling target portions are peeled from the peeling target side surfaces.

In this method of coating-peeling of a rectangular conductor wire, in the gripping step, the abutting sections of a pair of the gripping members abut on the gripping target portions, whereby the rectangular conductor wire is gripped and thereby has its position fixed between said abutting sections. At this time, each of the abutting sections of the pair of gripping members can undergo adjustment of its position in a width direction orthogonal to the peeling target side surfaces of the rectangular conductor wire, so a fixing position of the rectangular conductor wire with respect to the peeling blades can be easily adjusted.

Therefore, even when a thickness of the insulating coating varies, the rectangular conductor wire can have its position fixed such that a center in the width direction of the rectangular conductor wire and a center of a distance between peeling blades coincide. As a result, in the peeling step, it becomes possible for the peeling target portions disposed on both sides in the width direction of the rectangular conductor wire to each be favorably peeled.

It is clear from the above that this method of coating-peeling of a rectangular conductor wire enables the insulating coating to be peeled highly precisely even when the thickness of the insulating coating varies.

In the above-described method of coating-peeling of a rectangular conductor wire, it is preferable that a first side surface of the gripping members facing the peeling blades that have been moved to positions opposing each other sandwiching the peeling target side surfaces extends along a gripping direction of the gripping members, and that a second side surface opposing the first side surface of the gripping members is provided with a region that extends in such a manner that a cross-sectional area of the gripping members orthogonal to a surface direction of the first side surface gets larger from an abutting sections side to a proximal end side more separated from the gripping target portions than said abutting sections are.

By the second side surface being provided with the region extending as described above, a length in a direction orthogonal to the surface direction of the first side surface is configured shorter in the abutting sections of the gripping members compared to on the proximal end sides of the gripping members. Therefore, in the gripping step, when the abutting sections of the gripping members abut on the gripping target portions, positions close to the peeling target portions of the gripping target portions can be gripped, even when a surface direction orthogonal to the surface direction of the first side surface of the abutting sections is inclined with respect to a surface direction of the peeling target side surfaces. As a result, in the peeling step, the peeling target portions can be even more highly precisely peeled.

Moreover, assuming the second side surface to have been provided with the region extending as described above, it can be avoided that the cross-sectional area on the proximal end side of the gripping members gets small even when the cross-sectional area orthogonal to the surface direction of the first side surface of the abutting sections is made small, hence it can be suppressed that strength of the gripping members lowers.

In the above-described method of coating-peeling of a rectangular conductor wire, it is preferable that in the gripping step, the abutting sections of the gripping members abutting on the gripping target portions results in the rectangular conductor wire being gripped in a state where said gripping target portions have undergone elastic deformation. By the gripping target portions abutting on the abutting sections of the gripping members and being applied with a certain amount of thrusting such that the gripping target portions undergo elastic deformation in this way, in other words, in a range that the gripping target portions do not undergo plastic deformation, the rectangular conductor wire is gripped and thereby has its position fixed between said abutting sections. Due to a method of manufacturing the insulating coating, variation in thicknesses of both side surfaces in the width direction orthogonal to the extending direction of the rectangular conductor wire, of the insulating coating is extremely small. In other words, the rectangular conductor wire has its both side surfaces provided with an insulating coating having elasticity of substantially the same thickness and hardness. By applying precisely the same certain amounts of thrusting of each of the abutting sections of the pair of gripping members to the insulating coating provided to both side surfaces of the rectangular conductor wire and having elasticity of substantially the same thickness and hardness, the rectangular conductor wire can be moved to a position where restoring forces occurring due to elasticity of the insulating coating provided to both side surfaces of the rectangular conductor wire are in balance, in other words, moved to a center in between the gripping members, and can be positioned there.

Therefore, since even in a rectangular conductor wire having different thicknesses of the insulating coating, variation in thickness of insulating coatings provided to both side surfaces of the rectangular conductor wire is extremely small, then the above-described method of gripping makes it possible for the rectangular conductor wire to have its position fixed such that the center in the width direction of the rectangular conductor wire and the center of the distance between peeling blades coincide. As a result, in the peeling step, it becomes possible for the peeling target portions disposed on both sides in the width direction of the rectangular conductor wire to each be highly precisely peeled.

According to another embodiment of the present invention, there is provided a coating-peeling apparatus of a rectangular conductor wire that, assuming opposing side surfaces of the rectangular conductor wire to be a pair of peeling target side surfaces, peels peeling target portions of an insulating coating covering the peeling target side surfaces, including: a pair of gripping members that respectively include abutting sections capable of abutting on gripping target portions of the insulating coating covering the peeling target side surfaces, and that grip the rectangular conductor wire between the abutting sections opposing each other sandwiching the gripping target portions; and a pair of peeling blades that by moving relatively so as to be orthogonal to an extending direction of the rectangular conductor wire and follow a surface direction of the peeling target side surfaces while opposing each other sandwiching the peeling target side surfaces, are capable of respectively peeling the peeling target portions from the peeling target side surfaces.

Due to this coating-peeling apparatus of a rectangular conductor wire, each of the abutting sections of the pair of gripping members can undergo adjustment of its position in a width direction orthogonal to the peeling target side surfaces of the rectangular conductor wire. Therefore, relative positions of the peeling blades and the pair of gripping members can be accurately adjusted in advance, whereby the rectangular conductor wire can have its position fixed such that the center in the width direction of the rectangular conductor wire and the center of the distance between peeling blades coincide. This makes it possible for the insulating coating to be peeled highly precisely even when the thickness of the insulating coating varies.

In the above-described coating-peeling apparatus of a rectangular conductor wire, it is preferable that a first side surface of the gripping members facing the peeling blades that have been moved to positions opposing each other sandwiching the peeling target side surfaces extends along a gripping direction of the gripping members, and that a second side surface opposing the first side surface of the gripping members includes a region that extends in such a manner that a cross-sectional area of the gripping members orthogonal to a surface direction of the first side surface gets larger from an abutting sections side to a proximal end side more separated from the gripping target portions than said abutting sections are.

In this case, when the abutting sections of the gripping members abut on the gripping target portions, positions close to the peeling target portions of the gripping target portions can be gripped, even when the surface direction orthogonal to the surface direction of the first side surface of the abutting sections has ended up being inclined with respect to the surface direction of the peeling target side surfaces, so the peeling target portions can be even more highly precisely peeled. Moreover, since it can thus be avoided that the cross-sectional area on the proximal end side of the gripping members gets small even when the cross-sectional area orthogonal to the surface direction of the first side surface of the abutting sections is made small, then it can be suppressed that strength of the gripping members lowers.

In the above-described coating-peeling apparatus of a rectangular conductor wire, it is preferable that as a result of the abutting sections abutting on the gripping target portions, the gripping members grip the rectangular conductor wire in a state where the gripping target portions have undergone elastic deformation. In order that the gripping target portions undergo elastic deformation in this way, the gripping target portions abut on the abutting sections of the gripping members and are applied with a certain amount of thrusting, whereby the gripping target portions can be favorably gripped between gripping members, without the rectangular conductor wire ever undergoing plastic deformation. Moreover, due to the substantially identical restoring forces occurring in the insulating coating on both side surfaces of the rectangular conductor wire, the rectangular conductor wire is moved to the center in between the gripping members and positioned there, and is favorably maintained in a positioned state. As a result, peeling precision of the peeling target portions can be increased.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
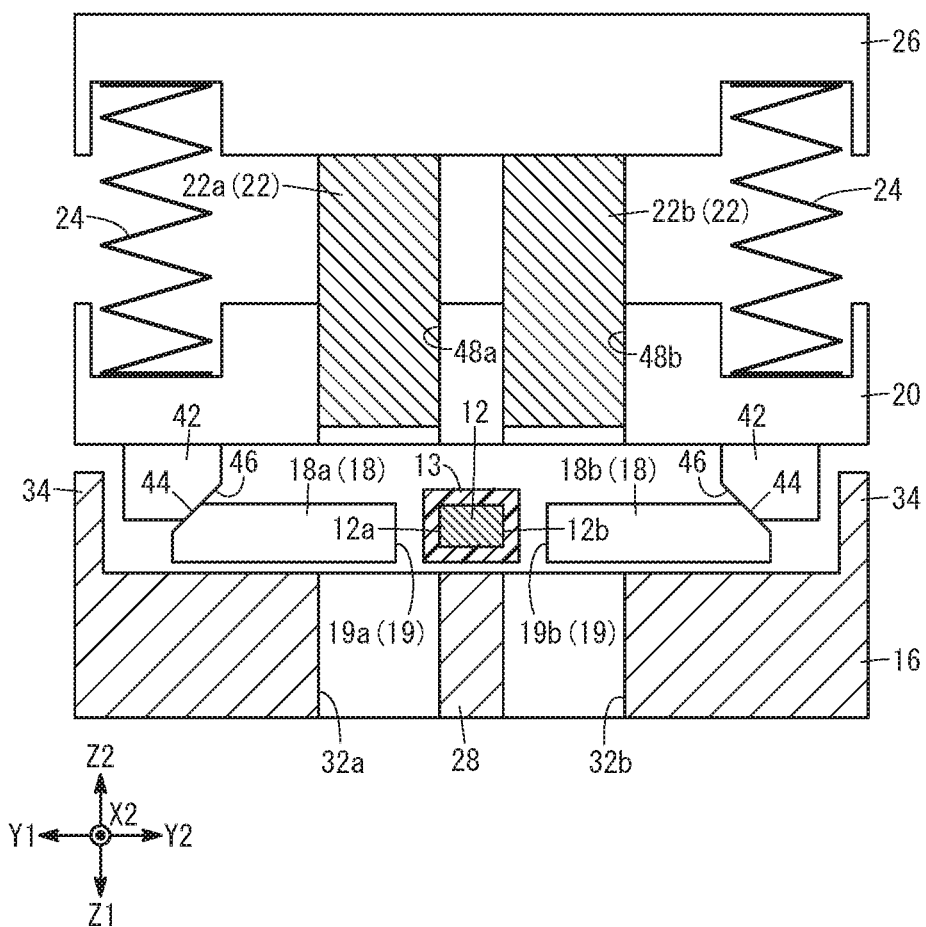
FIG. 1 is a schematic cross-sectional view of a coating-peeling apparatus of a rectangular conductor wire according to an embodiment of the present invention.

A preferred embodiment of a method of coating-peeling and a coating-peeling apparatus of a rectangular conductor wire according to the present invention will be presented and described in detail below with reference to the accompanying drawings.

As shown in FIGS. 1 to 12, a coating-peeling apparatus of a rectangular conductor wire (hereafter, also called simply a coating-peeling apparatus) 10 according to the present embodiment peels an insulating coating 13 covering side surfaces of a rectangular conductor wire 12. The rectangular conductor wire 12 is formed from an electrically conductive material such as copper or aluminum, for example, and its cross section orthogonal to its extending direction (hereafter, also called simply its cross section) is rectangular in shape. The insulating coating 13 is configured from the likes of a resin showing electrical insulating properties, for example. Moreover, thicknesses of the insulating coating 13 covering opposing side surfaces of the rectangular conductor wire 12 are formed so as to be substantially equal.

Hereafter, the coating-peeling apparatus 10 will be described in relation to an example in which side surfaces configuring short sides of the cross section of the rectangular conductor wire 12 are assumed to be a pair of peeling target side surfaces 12a, 12b, and peeling target portions 14a, 14b (refer to FIG. 2, and so on) of the insulating coating 13 covering said peeling target side surfaces 12a, 12b are peeled. Note that for ease of understanding, in FIGS. 2, 4, 5A, and 5B, the peeling target portions 14a, 14b are indicated by hatching. Side surfaces configuring long sides of the cross section of the rectangular conductor wire 12 too can have their insulating coating 13 peeled similarly to the side surfaces configuring the short sides, hence detailed descriptions thereof will be omitted.

Directions for each of configuring elements of the coating-peeling apparatus 10 will be described with reference to: an extending direction of the rectangular conductor wire 12 that has been set in the coating-peeling apparatus 10 as will be mentioned later (a direction of the arrows X1, X2 in FIG. 2, and so on); a width direction orthogonal to the peeling target side surfaces 12a, 12b of the rectangular conductor wire 12 (a direction of the arrows Y1, Y2 in FIG. 1, and so on); and a direction orthogonal to the width direction and following the peeling target side surfaces 12a, 12b (a direction of the arrows Z1, Z2 in FIG. 1, and so on). Hereafter, the above-described extending direction of the rectangular conductor wire 12 will also be called an X direction, the above-described width direction will also be called a Y direction, and the above-described direction orthogonal to the width direction and following the peeling target side surfaces 12a, 12b will also be called a Z direction.

The coating-peeling apparatus 10 mainly includes: a base 16; a gripping member 18; a gripping member pressing plate 20; peeling blades 22a, 22b (hereafter, these will also be collectively called peeling blades 22); an elastic member 24; a peeling blade pressing plate 26; and an unillustrated drive mechanism and feeding mechanism.

As shown in FIG. 1, the base 16 is provided with a setting section 28 that extends in the X direction through substantially a central portion in the Y direction of said base 16. The rectangular conductor wire 12 is supplied via the feeding mechanism and guides 30 (refer to FIG. 2) along this setting section 28, whereby the rectangular conductor wire 12 is set in the coating-peeling apparatus 10. A pair of notches 32a, 32b extending in the X direction are formed on both sides in the Y direction of the setting section 28. Moreover, both ends in the Y direction of the base 16 are provided with a projecting section 34 that projects toward the gripping member pressing plate 20.

Figure 2:
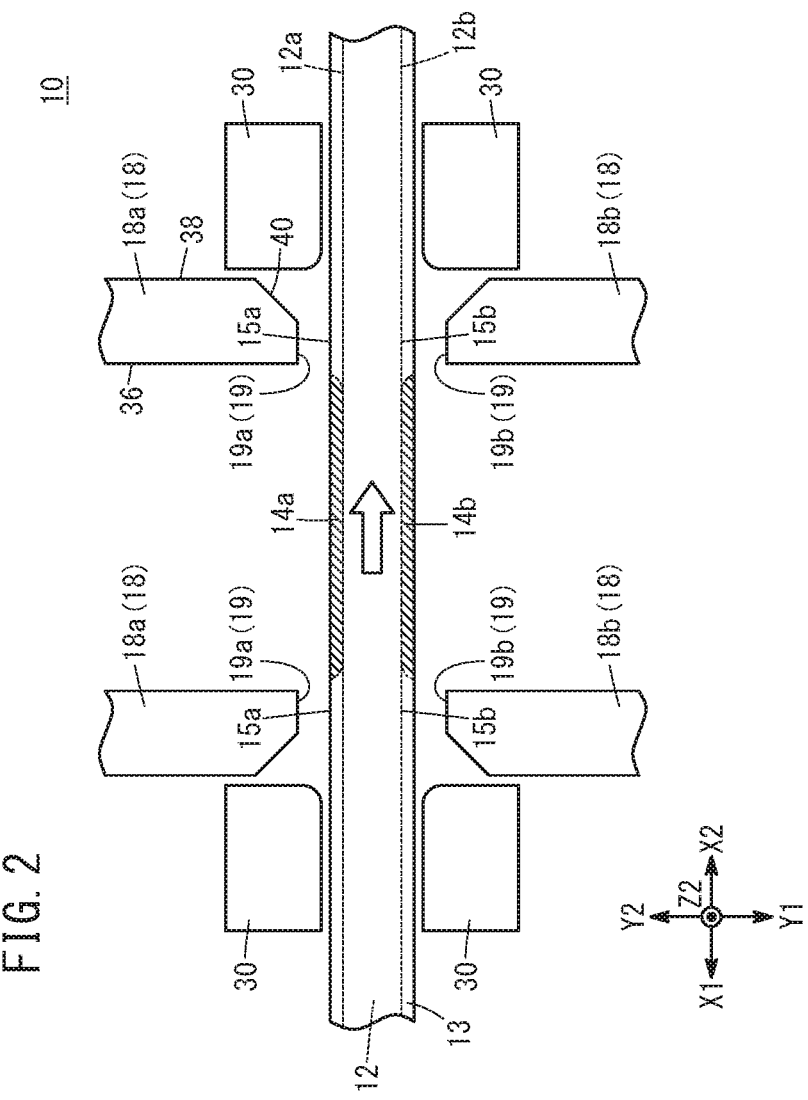
FIG. 2 is a schematic plan view of essential parts of the coating-peeling apparatus of FIG. 1.

As shown in FIG. 2, the coating-peeling apparatus 10 according to the present embodiment includes a total of two pairs of gripping members 18a, 18b where two items of gripping members 18a, 18b are assumed to be a pair, that is, includes four gripping members 18a, 18a, 18b, 18b. These four gripping members 18a, 18a, 18b, 18b will also be collectively called gripping members 18. A pair of the gripping members 18a, 18b are configured such that abutting sections 19a, 19b at distal ends of the gripping members 18a, 18b oppose each other sandwiching the rectangular conductor wire 12, and such that, as will be mentioned later, the pair of gripping members 18a, 18b are capable of moving in a direction of approaching or separating from each other in the Y direction. The abutting sections 19a, 19b will also be collectively called abutting sections 19.

Moreover, the abutting sections 19a, 19b of a pair of the gripping members 18a, 18b that have moved in the direction of approaching each other respectively abut on gripping target portions 15a, 15b (refer to FIGS. 2 and 4) of the insulating coating 13 covering the peeling target side surfaces 12a, 12b. As a result, the rectangular conductor wire 12 is gripped between abutting sections 19a, 19b of the pair of gripping members 18a, 18b.

The two pairs of gripping members 18, in other words, one of the pairs of gripping members 18a, 18b and the other of the pairs of gripping members 18a, 18b are aligned at a distance in the X direction. A configuration is adopted that, as will be mentioned later, enables the peeling blades 22 that move along the Z direction to be interposed between these two pairs of gripping members 18 (refer to FIG. 7). When the peeling blades 22a, 22b are positioned opposing each other sandwiching the peeling target side surfaces 12a, 12b, a first side surface 36 of the gripping members 18 faces the peeling blades 22. This first side surface 36 extends in the Y direction (a gripping direction of the gripping members 18).

A second side surface 38 opposing the first side surface 36 of the gripping members 18 is provided with an inclined region 40 (refer to FIG. 2) as a region extending such that a cross-sectional area along the X direction of the gripping members 18 gets larger from an abutting sections 19 side to a proximal end side in the Y direction. Note that the second side surface 38, instead of being provided with the inclined region 40 extending linearly when viewed from the Z direction, may be provided with a region extending in a curved shape or a bent shape such that the above-described cross-sectional area gets larger from the abutting sections 19 side to the proximal end side in the Y direction. Furthermore, as shown in FIG. 1, the proximal end side of the gripping members 18 is provided with a first cam surface 44. The first cam surface 44 contacts a second cam surface 46 of transmission sections 42 that project toward the base 16 from the gripping member pressing plate 20.

Note that in the coating-peeling apparatus 10 having the two pairs of gripping members 18 and the peeling blades 22 disposed therein as described above, the gripping target portions 15a, 15b are as a result respectively disposed on both sides in the X direction of the peeling target portions 14a, 14b of the rectangular conductor wire 12 (refer to FIG. 2).

As shown in FIG. 1, the gripping member pressing plate 20 has insertion holes 48a, 48b formed therein at positions facing the notches 32a, 32b of the base 16. The peeling blades 22a, 22b are respectively inserted in these insertion holes 48a, 48b. Moreover, the gripping member pressing plate 20 is driven in a direction of approaching or separating from the base 16, along with the peeling blade pressing plate 26, by the drive mechanism. As shown in FIG. 1, in a state where the gripping member pressing plate 20 has been separated from the base 16, the projecting sections 34 of the base 16 and the gripping member pressing plate 20 are also separated. Moreover, the gripping members 18 are disposed in positions where the abutting sections 19 are separated from the peeling target side surfaces 12a, 12b of the rectangular conductor wire 12.

When, from the above-described state, the gripping member pressing plate 20 is caused to approach the base 16, the transmission sections 42 projecting from said gripping member pressing plate 20 also approach the base 16. Consequently, a driving force of the drive mechanism is transmitted to the first cam surface 44 of the gripping members 18 via the second cam surface 46 of the transmission sections 42. As a result, the gripping members 18 move to sides of approaching the gripping target portions 15a, 15b of the rectangular conductor wire 12.

Figure 3:
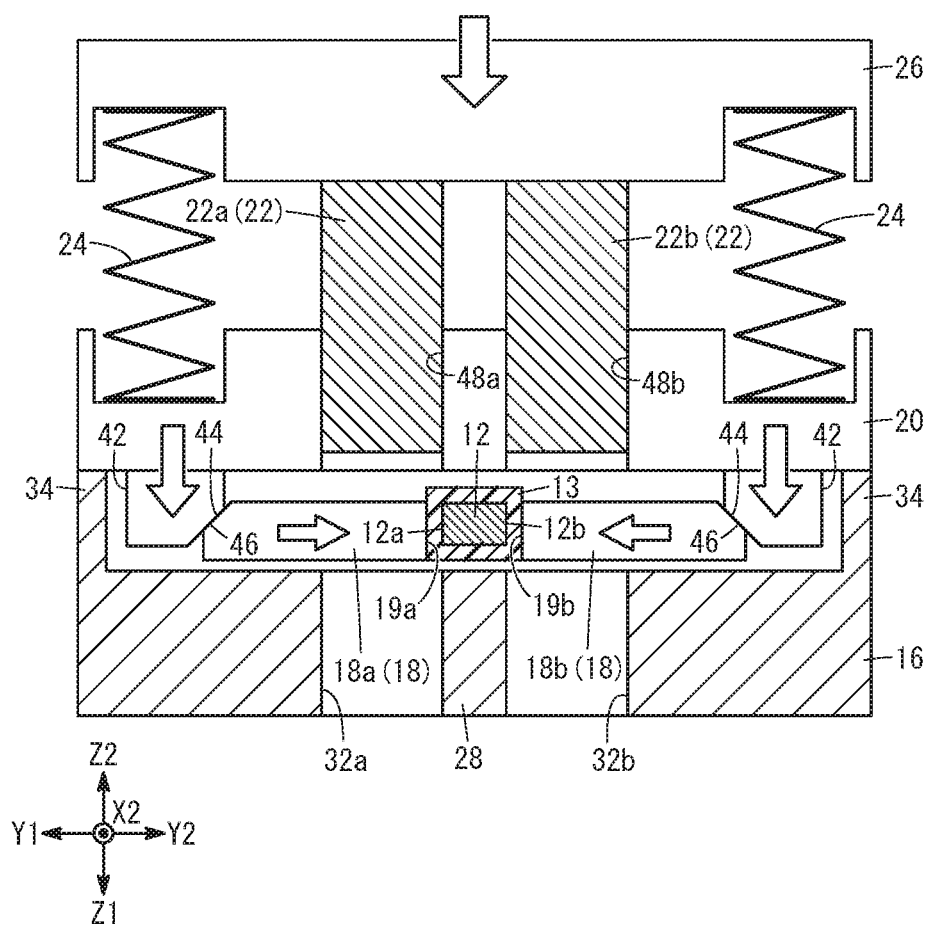
FIG. 3 is a schematic cross-sectional view showing a state where the rectangular conductor wire has been gripped by gripping members of the coating-peeling apparatus of FIG. 1.

Then, as shown in FIG. 3, the gripping member pressing plate 20 and the projecting sections 34 abut on each other, whereby further movement of the gripping member pressing plate 20 is restricted. By thus using the drive mechanism to maintain a state of the gripping member pressing plate 20 and the projecting sections 34 having abutted on each other, it is possible to maintain a state of the gripping target portions 15a, 15b having been gripped between abutting sections 19 of the gripping members 18. A distance between abutting sections 19 of the gripping members 18 at this time is set so as to attain a state where the gripping target portions 15a, 15b sandwiched between said abutting sections 19 have undergone elastic deformation.

Moreover, when the gripping member pressing plate 20 is separated from the base 16 by the drive mechanism, the transmission sections 42 are also separated from the base 16, so the gripping members 18 move in the direction of separating from the gripping target portions 15a, 15b of the rectangular conductor wire 12.

The peeling blades 22a, 22b each extend in the Z direction and oppose each other at a distance in the Y direction. This distance between peeling blades 22a, 22b is set to a size that accords with a distance between peeling target side surfaces 12a, 12b (a length in the Y direction of the rectangular conductor wire 12). Proximal end sides (the arrow Z2 side in FIG. 1) of the peeling blades 22a, 22b are fixed to the peeling blade pressing plate 26.

Distal end sides (sides of the arrow Z1 in FIG. 1) of the peeling blades 22a, 22b respectively face the notches 32a, 32b of the base 16, via the insertion holes 48a, 48b of the gripping member pressing plate 20. Moreover, the distal end sides of the peeling blades 22a, 22b are respectively provided with blade edges that contact and thereby peel the peeling target portions 14a, 14b covering the peeling target side surfaces 12a, 12b.

Both end sides in the Y direction of the peeling blade pressing plate 26 are coupled to the gripping member pressing plate 20 via the elastic members 24. The elastic members 24 applies an elastic bias such that the peeling blade pressing plate 26 and the gripping member pressing plate 20 separate from each other in the Z direction. As a result, the peeling blade pressing plate 26 is driven in the direction of approaching the base 16 by the drive mechanism, along with the gripping member pressing plate 20, until said gripping member pressing plate 20 abuts on the projecting sections 34. At this time, the distal end sides of the peeling blades 22a, 22b are respectively housed inside the insertion holes 48a, 48b of the gripping member pressing plate 20, and do not project to a base 16 side (refer to FIGS. 1 and 3).

Figure 6:
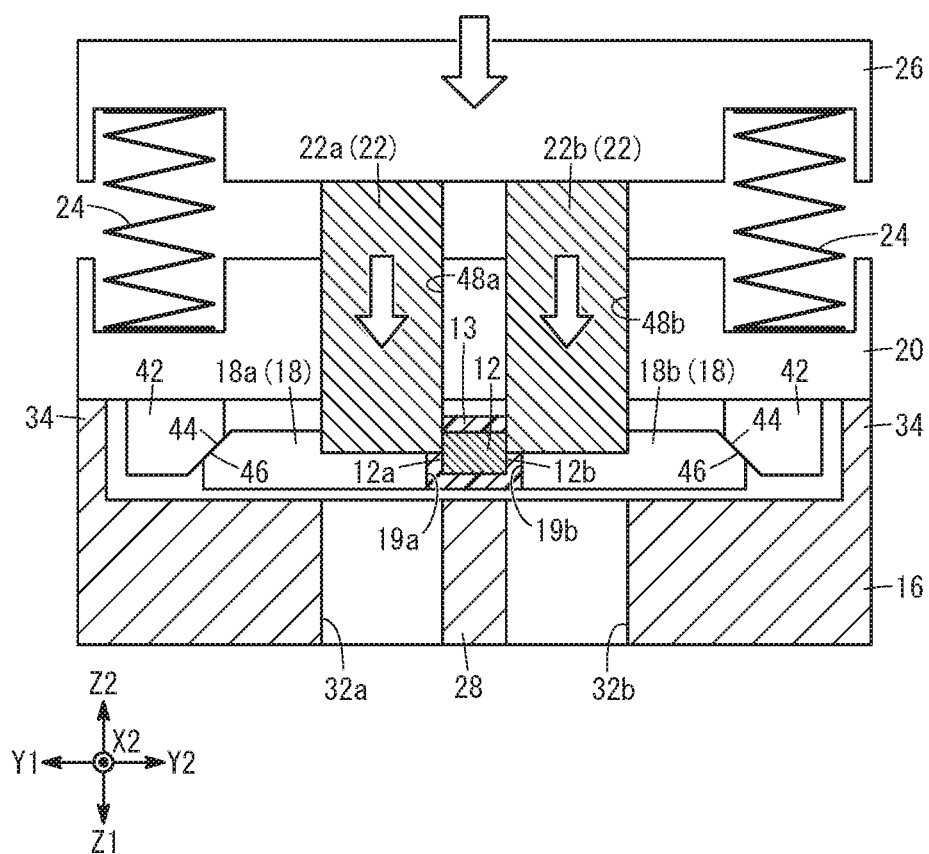
FIG. 6 is a schematic cross-sectional view explaining what it looks like when peeling blades of the coating-peeling apparatus of FIG. 3 are moved toward the peeling target portions.

Then, as shown in FIG. 6, after the gripping member pressing plate 20 has abutted on the projecting sections 34, the peeling blade pressing plate 26 alone is driven in the direction of approaching the base 16. That is, regarding the gripping member pressing plate 20 that has abutted on the projecting sections 34 to have its further movement restricted, the peeling blade pressing plate 26 is driven so as to approach this gripping member pressing plate 20 opposing an elastic force of the elastic members 24. This makes it possible for the distal end sides of the peeling blades 22a, 22b to project to the base 16 side via the insertion holes 48a, 48b.

The coating-peeling apparatus 10 is basically configured as described above. A method of coating-peeling of a rectangular conductor wire (hereafter, also called simply a method of coating-peeling) will be described below in relation to operation of this coating-peeling apparatus 10. In this method of coating-peeling, first, as shown in FIGS. 1 and 2, the rectangular conductor wire 12 that has the peeling target side surfaces 12a, 12b covered by the insulating coating 13, is set in the coating-peeling apparatus 10. Specifically, said rectangular conductor wire 12 is supplied onto the setting section 28 of the base 16 via the feeding mechanism and the guides 30, in a state where the gripping member pressing plate 20 and the peeling blade pressing plate 26 have been moved in the direction of separating from the base 16 by the drive mechanism.

Figure 4:
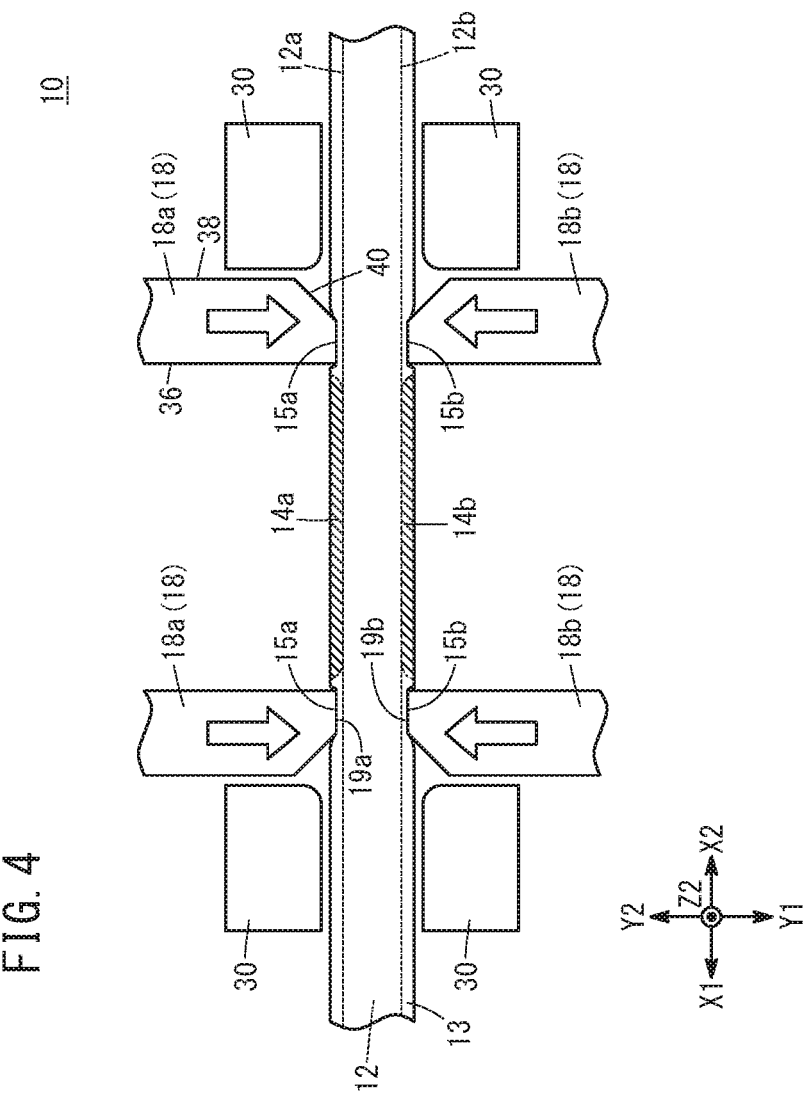
FIG. 4 is a schematic plan view of essential parts of the coating-peeling apparatus of FIG. 3.

Next, the drive mechanism is used to drive the gripping member pressing plate 20 and the peeling blade pressing plate 26 in the direction of approaching the base 16, thereby performing a gripping step. That is, by the driving force of the drive mechanism being transmitted to the gripping members 18 via the transmission sections 42 of the gripping member pressing plate 20, the pair of gripping members 18a, 18b are moved in the Y direction such that their respective abutting sections 19a, 19b approach each other. Then, as shown in FIGS. 3 and 4, the gripping member pressing plate 20 abuts on the projecting sections 34 of the base 16, whereby the abutting sections 19a, 19b of the pair of gripping members 18a, 18b can be maintained in a state of having respectively abutted on the gripping target portions 15a, 15b. As a result, the gripping target portions 15a, 15b are gripped in a state of having undergone elastic deformation, between abutting sections 19a, 19b.

Figure 5A:
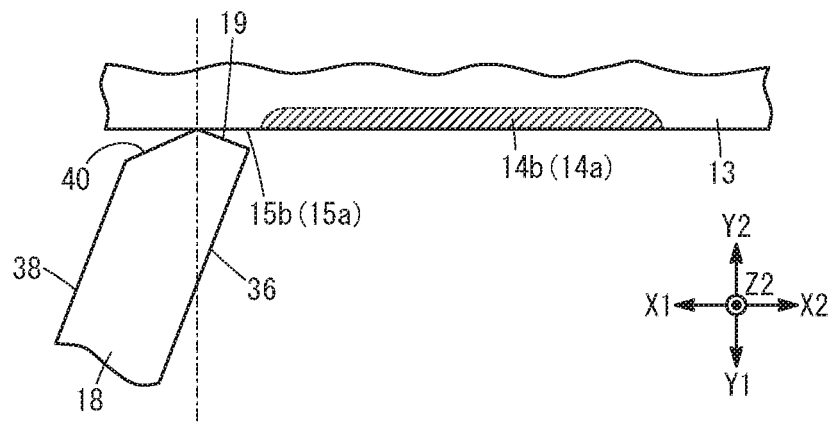
FIG. 5A is an enlarged explanatory diagram of essential parts explaining a relationship of the gripping members and peeling target portions of FIG. 4.
Figure 5B:
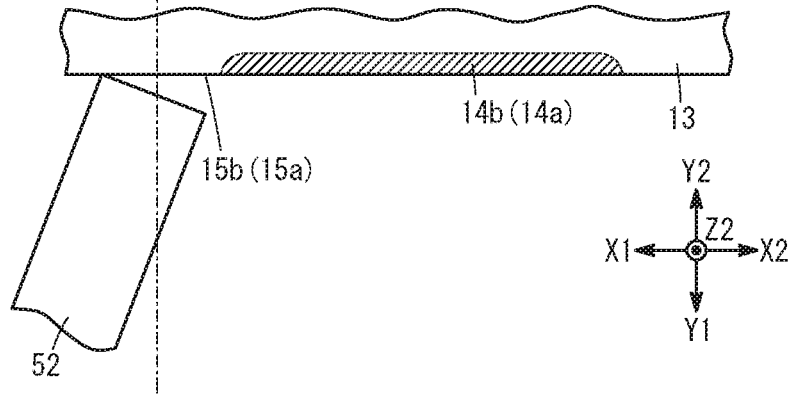
FIG. 5B is an enlarged explanatory diagram of essential parts explaining a relationship of gripping members and peeling target portions according to a modified example.

Sometimes, at this time, as shown in, for example, FIG. 5A, a surface direction orthogonal to a surface direction of the first side surface 36 of the abutting sections 19 of the gripping members 18 is inclined with respect to the X direction. Since, in the gripping members 18 of the present embodiment, the second side surface 38 is provided with the inclined region 40, then, even in this case, it is more possible for the abutting sections 19 to abut on positions close to the peeling target portions 14a, 14b, compared to in gripping members 52 not provided with the inclined region 40 shown in FIG. 5B.

Figure 7:
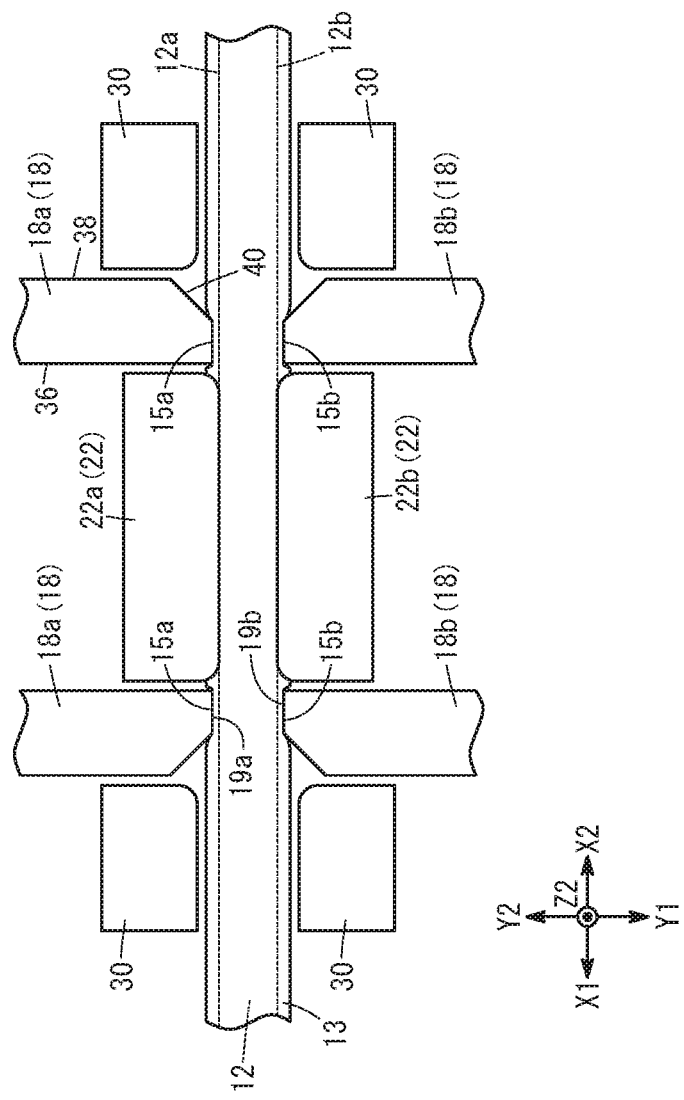
FIG. 7 is a schematic plan view of essential parts of the coating-peeling apparatus of FIG. 6.

Even after the gripping member pressing plate 20 and the projecting sections 34 have abutted on each other, the peeling blade pressing plate 26 is caused to approach the base 16 by the drive mechanism, thereby performing a peeling step. That is, in the peeling step, the distal end sides of the peeling blades 22a, 22b are projected to the base 16 side via the insertion holes 48a, 48b, while the rectangular conductor wire 12 is still gripped between abutting sections 19a, 19b of the gripping members 18a, 18b. As a result, as shown in FIGS. 6 and 7, the peeling blades 22a, 22b move in the Z direction while respectively contacting the peeling target portions 14a, 14b, and opposing each other sandwiching the peeling target side surfaces 12a, 12b.

Figure 8:
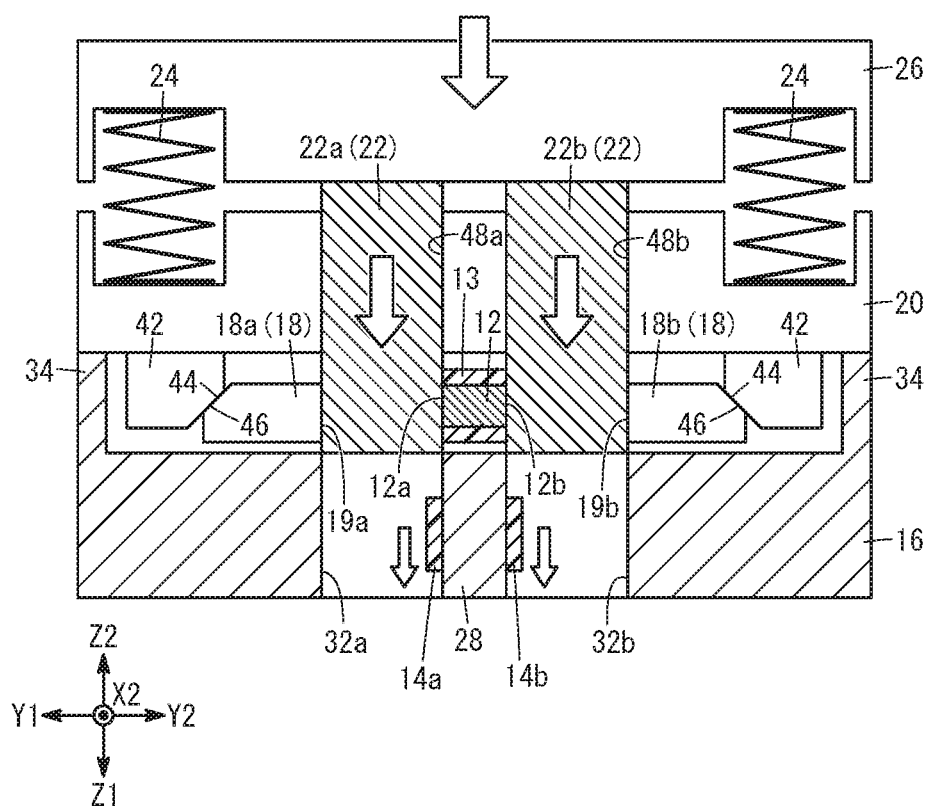
FIG. 8 is a schematic cross-sectional view explaining a state where the peeling blades of the coating-peeling apparatus of FIG. 6 have been further moved thereby peeling the peeling target portions.
Figure 9:
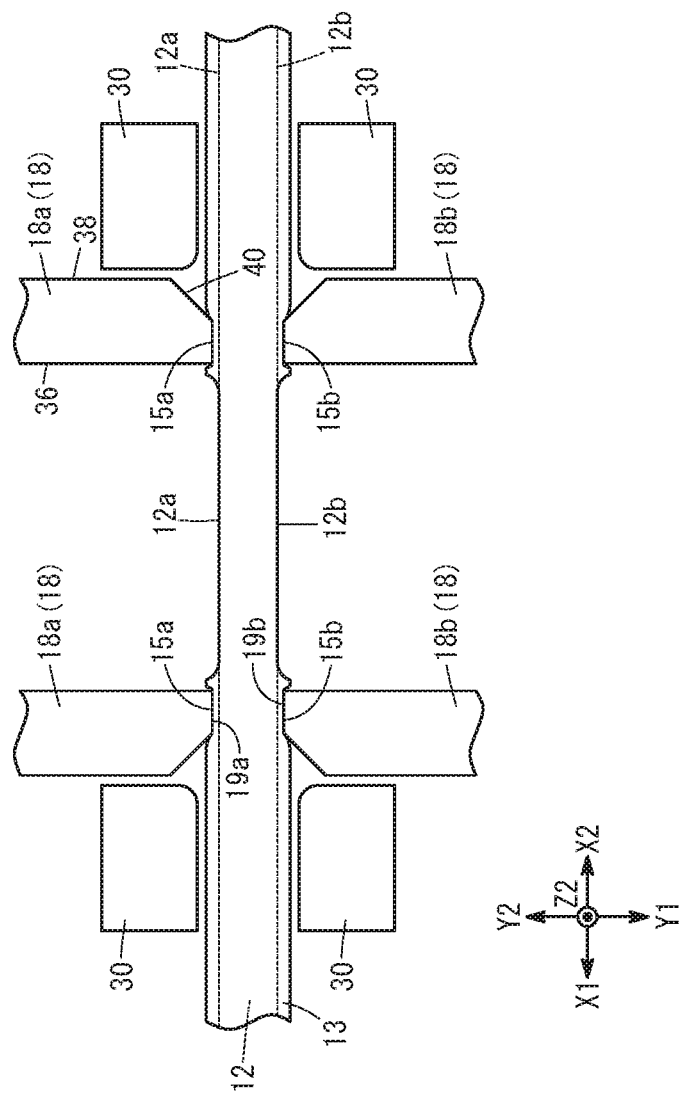
FIG. 9 is a schematic plan view of essential parts of the coating-peeling apparatus of FIG. 8.

Then, as shown in FIGS. 8 and 9, the distal ends of the peeling blades 22a, 22b are moved from an end section on one end side in the Z direction (the side of the arrow Z1) to an end section on the other end side in the Z direction (the side of the arrow Z2), of the peeling target portions 14a, 14b, whereby the whole of the peeling target portions 14a, 14b covering the peeling target side surfaces 12a, 12b can be peeled. As shown in FIG. 8, a configuration is adopted enabling the peeled peeling target portions 14a, 14b to be respectively discharged out of the coating-peeling apparatus 10 via the notches 32a, 32b. Note that in FIG. 9, illustration of the peeling blades 22a, 22b is omitted.

Figure 10:
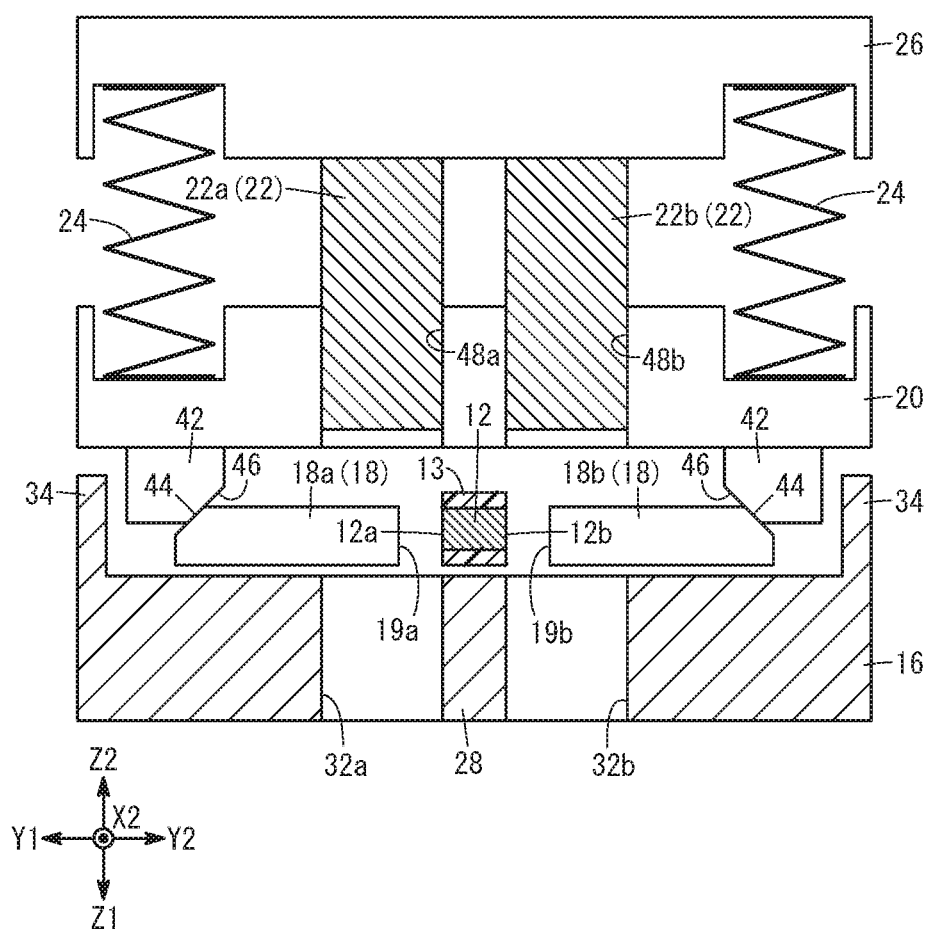
FIG. 10 is a schematic cross-sectional view explaining a state where the peeling blades and the gripping members of the coating-peeling apparatus of FIG. 8 have been separated from the rectangular conductor wire.
Figure 11:
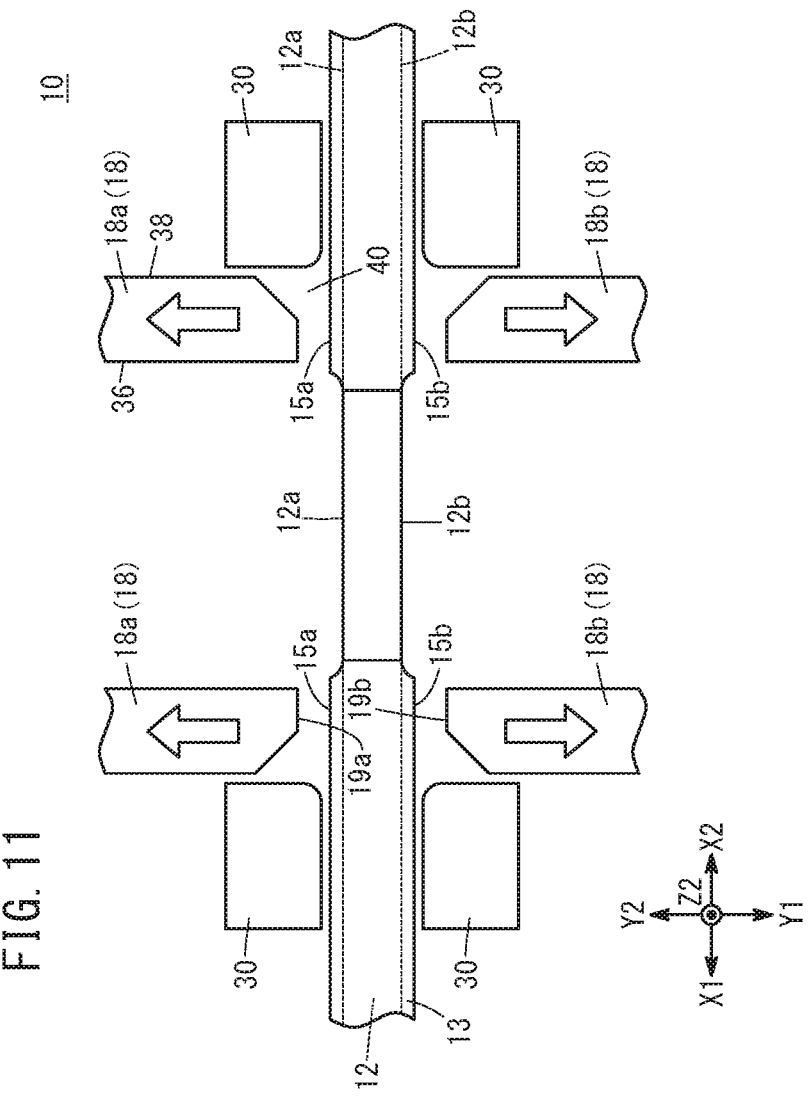
FIG. 11 is a schematic plan view of essential parts of the coating-peeling apparatus of FIG. 10.

Next, as shown in FIGS. 10 and 11, the gripping member pressing plate 20 and the peeling blade pressing plate 26 are driven in the direction of separating from the base 16, by the drive mechanism. As a result, the peeling blades 22a, 22b are housed in the insertion holes 48a, 48b, and then the gripping members 18a, 18b are separated from the gripping target portions 15a, 15b.

Figure 12:
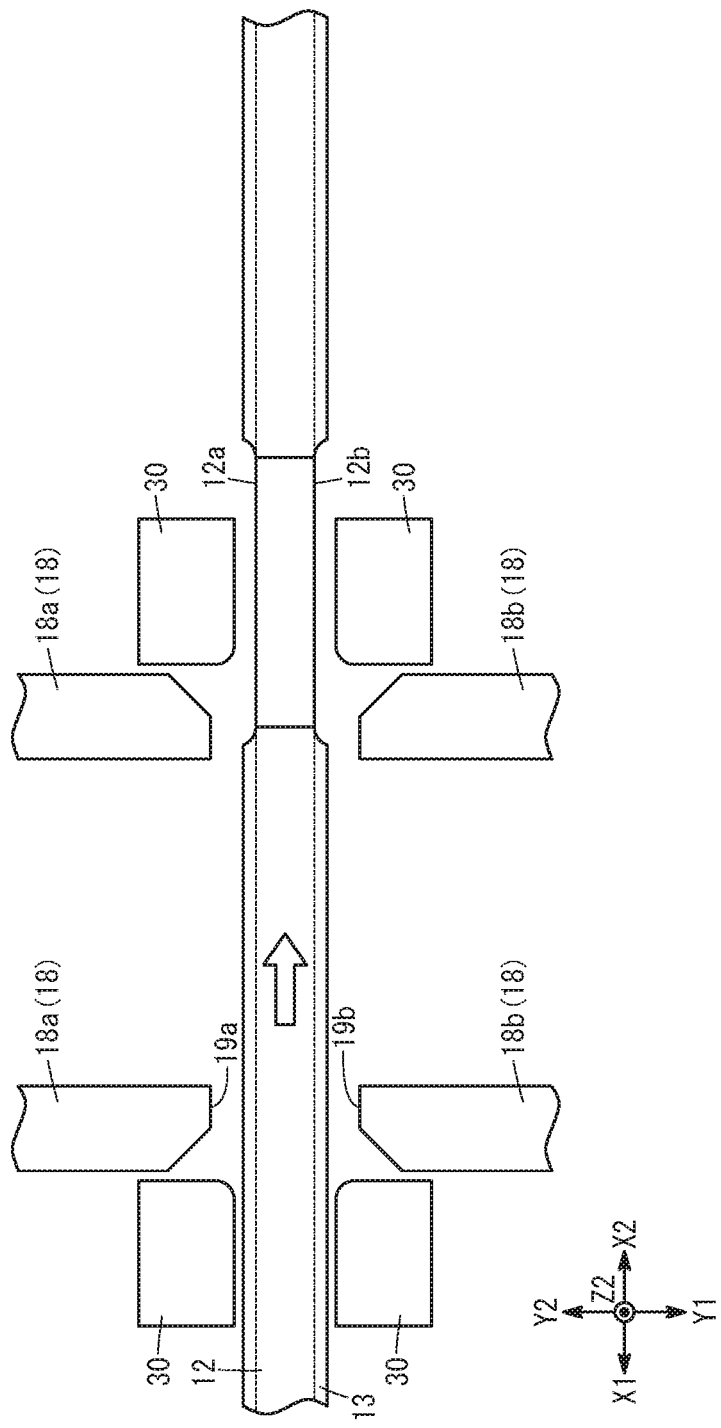
FIG. 12 is a schematic plan view of essential parts explaining what it looks like when the rectangular conductor wire of the coating-peeling apparatus of FIG. 11 is moved in a feeding direction.

Next, as shown in FIG. 12, the rectangular conductor wire 12 is fed to, for example, the arrow X2 side, by the feeding mechanism and the guides 30. As a result, new gripping target portions 15a, 15b of the insulating coating 13 covering the peeling target side surfaces 12a, 12b are disposed between the gripping members 18a, 18b, and new peeling target portions 14a, 14b are disposed between the peeling blades 22a, 22b. Thereafter, by going through steps similar to those described above, the peeling target portions 14a, 14b can proceed to be peeled from the peeling target side surfaces 12a, 12b along the extending direction of the rectangular conductor wire 12.

The coating-peeling apparatus 10 and the method of coating-peeling according to the present embodiment display the following advantages. In the above-described gripping step, the gripping target portions 15a, 15b respectively abut on the abutting sections 19a, 19b of the pair of gripping members 18a, 18b, whereby the rectangular conductor wire 12 is gripped and thereby has its position fixed between said abutting sections 19a, 19b. At this time, the fixing position of the rectangular conductor wire 12 with respect to the peeling blades 22 can be easily adjusted by adjusting each of positions in the Y direction of the abutting sections 19a, 19b of the pair of gripping members 18a, 18b. For example, position adjustment in the Y direction of the abutting sections 19a, 19b of the pair of gripping members 18a, 18b can be performed by adjusting each of lengths in the Y direction of the gripping members 18a, 18b or projecting lengths of the projecting sections 34, and so on.

Therefore, a rectangular conductor wire 12 in which thickness of the insulating coating 13 varies can have its position fixed such that a center of a length in the Y direction of the rectangular conductor wire 12 and the center of the distance between peeling blades 22a, 22b coincide, based on said thickness of the insulating coating 13. As a result, in the peeling step, it becomes possible for each of both of the peeling target portions 14a, 14b disposed on both sides in the Y direction of the rectangular conductor wire 12, to be favorably peeled.

It is clear from the above that these coating-peeling apparatus 10 and method of coating-peeling make it possible for the insulating coating 13 to be peeled highly precisely even when the thickness of the insulating coating 13 varies.

Moreover, as described above, in the gripping members 18 where the second side surface 38 of the gripping members 18 has been provided with the inclined region 40, the abutting sections 19 can abut on positions close to the peeling target portions 14*a*, 14*b*, even when the surface direction orthogonal to the surface direction of the first side surface 36 of the abutting sections 19 is inclined with respect to the X direction. As a result, in the peeling step, the peeling blades 22*a*, 22*b* can be favorably brought into contact with the peeling target portions 14*a*, 14*b*, so it becomes possible for said peeling target portions 14*a*, 14*b* to be even more highly precisely peeled.

In the gripping members 18 provided with the inclined region 40 as described above, the cross-sectional area orthogonal to the first side surface 36 on the abutting sections 19 side can be made small, while still maintained is the size of the cross-sectional area orthogonal to the surface direction of the first side surface 36 on the proximal end side. That is, since it can be avoided that the cross-sectional area on the proximal end side of the gripping members 18 gets small, then it can be suppressed that strength of said gripping members 18 lowers.

Furthermore, in the above-described gripping step, by the gripping members 18*a*, 18*b* being fixed in certain positions via the transmission sections 42 provided to the gripping member pressing plate 20, position fixing of the rectangular conductor wire 12 gripped between said gripping members 18*a*, 18*b* can be performed. At this time, the gripping target portions 15*a*, 15*b* abut on the abutting sections 19*a*, 19*b* of the gripping members 18*a*, 18*b* and applied with a certain amount of thrusting, in such a manner that said gripping target portions 15*a*, 15*b* undergo elastic deformation, in other words, in a range that the gripping target portions 15*a*, 15*b* do not undergo plastic deformation.

Due to a method of manufacturing the insulating coating 13, variation in thicknesses of both side surfaces in the width direction orthogonal to the extending direction of the rectangular conductor wire 12, of the insulating coating 13 is extremely small. In other words, the rectangular conductor wire 12 includes on its both side surfaces the insulating coating 13 having elasticity of substantially the same thickness and hardness. By applying precisely the same certain amounts of thrusting of each of the abutting sections 19*a*, 19*b* of the pair of gripping members 18*a*, 18*b* to the insulating coating 13 (the gripping target portions 15*a*, 15*b*) provided to both side surfaces of the rectangular conductor wire 12 and having elasticity of substantially the same thickness and hardness, the rectangular conductor wire 12 can be moved to a position where restoring forces occurring due to elasticity of the insulating coating 13 provided to both side surfaces of the rectangular conductor wire 12 are in balance, in other words, to a center in between the gripping members 18*a*, 18*b*, and can be positioned there.

Therefore, since even in a rectangular conductor wire 12 having different thicknesses of the insulating coating, variation in thickness of insulating coatings 13 provided to both side surfaces of the rectangular conductor wire 12 is extremely small, then the above-described method of gripping makes it possible for the rectangular conductor wire 12 to have its position fixed such that the center in the width direction of the rectangular conductor wire 12 and the center of the distance between peeling blades 22*a*, 22*b* coincide. As a result, in the peeling step, it becomes possible for the peeling target portions 14*a*, 14*b* disposed on both sides in the width direction of the rectangular conductor wire 12 to each be highly precisely peeled.

Now, as another configuration for adjusting the fixing position of the rectangular conductor wire 12, there may be cited a configuration (no part of which is illustrated) in which, for example, the transmission sections 42 attached to the gripping member pressing plate 20 are assumed to be a configuration capable of sliding in a Z axis direction with respect to the gripping member pressing plate 20, and in which there are included new elastic members between the transmission sections 42 and the gripping member pressing plate 20, and in which, due to restoring forces of the new elastic members, the rectangular conductor wire 12 undergoes elastic gripping with the transmission sections 42 and the gripping members 18 interposed.

In this configuration, due to the restoring forces of the elastic members that have undergone a certain amount of bending, the transmission sections 42 and the gripping members 18, while sliding along a guide surface supporting each in a sliding manner (for example, a work stand upper surface), adjust the fixing position of the rectangular conductor wire 12. Therefore, frictional forces occur between each of the gripping member pressing plate 20 and transmission sections 42, the transmission sections 42 and gripping members 18, and the gripping members 18 and base 16. Regarding the restoring forces due to the new elastic members disposed opposing each other, since these restoring forces cancel out in a vicinity of a final positioning position of the rectangular conductor wire 12, an adjustment thrust on the rectangular conductor wire 12 generated in a direction of adjusting the position of the rectangular conductor wire 12 becomes extremely close to zero.

Therefore, there ends up existing a range (a dead zone due to a static frictional force) where, even when the restoring forces of the new elastic members act in order to adjust the fixing position of the rectangular conductor wire 12, the above-described frictional forces end up exceeding the restoring forces extremely close to zero and the rectangular conductor wire 12 cannot be moved. As a result, in the dead zone where the adjustment thrust of the rectangular conductor wire 12 has ended up getting smaller than the static frictional force, there inevitably ends up a variation in the position of the rectangular conductor wire 12.

Unlike in this kind of configuration, in the coating-peeling apparatus 10 and the method of coating-peeling according to the present embodiment, it is possible to adopt a configuration that, by position control in the Y direction of the abutting sections 19 of the gripping members 18, applies a load directly to the rectangular conductor wire 12 to adjust the fixing position of the rectangular conductor wire 12. This adjustment of the fixing position is affected only by a slight static frictional force occurring between the insulating coating 13 and the work stand, and by elasticity of the gripping target portions 15*a*, 15*b* and the rectangular conductor wire 12. Since elastic moduli of the gripping target portions 15*a*, 15*b* and the rectangular conductor wire 12 are sufficiently larger compared to an elastic modulus of the above-described elastic members, and, moreover, since there is no sliding member (there is no source of a static frictional force) in between a generation position of the restoring forces due to the elastic members and the rectangular conductor wire 12, effects of the dead zone due to the static frictional force can be made extremely small, and positioning of the rectangular conductor wire 12 with good precision can be easily performed. Moreover, the coating-peeling apparatus 10 can be downsized and simplified to the extent that a load controlling configuration can be rendered unnecessary.

The present invention is not particularly limited to the above-described embodiment, and may undergo a variety of modifications in a range not departing from the spirit of the present invention.

What is claimed is:

1. A coating-peeling apparatus, comprising:

a pair of gripping members comprising a first gripping member that comprises a first abutting section and a second gripping member that comprises a second abutting section, wherein the first abutting section and the second abutting section oppose each other; and a pair of peeling blades, wherein the first abutting section and the second abutting section move in a first direction that is orthogonal to a second direction of movement of the pair of peeling blades; and respective first side surfaces of the pair of gripping members face the pair of peeling blades in a state where the pair of peeling blades have been moved to the extended state, and respective second side surfaces, opposing the first side surfaces, of the pair of gripping members include respective inclined regions that are angled toward the respective first side surfaces at portions closest to the respective abutting sections in such a manner that a cross-sectional area of the pair of gripping members gets larger from the respective abutting sections toward the respective second side surfaces and opposed to the respective abutting sections along the first direction, wherein the respective abutting sections comprise the first abutting section and the second abutting section.

2. The coating-peeling apparatus according to claim 1, wherein
the pair of peeling blades oppose each other at a distance.

3. The coating-peeling apparatus according to claim 1, wherein
the pair of gripping members respectively include a pair of cam surfaces at respective proximal ends of the pair of gripping members.

4. The coating-peeling apparatus according to claim 3, further comprising:
a base, and
a gripping member pressing plate; wherein
the pair of cam surfaces respectively contact a pair of cam surfaces of transmission sections that project toward the base from the gripping member pressing plate.

5. The coating-peeling apparatus according to claim 1, wherein the pair of gripping members are a first pair of gripping members, and wherein the coating-peeling apparatus further comprises a second pair of gripping members, wherein the first pair of gripping members are aligned at a distance from the second pair of gripping members in the first direction.

6. The coating-peeling apparatus according to claim 1, wherein based on movement in the second direction, the pair of peeling blades are interposed between the pair of gripping members.

7. The coating-peeling apparatus according to claim 1, wherein the first abutting section is located at a distal end of the first gripping member and the second abutting section is located at a distal end of the second gripping member.

* * * * *